Dec. 31, 1935.  S. B. HENDRICKS  2,026,130
DRAFT EQUALIZER
Filed April 5, 1935
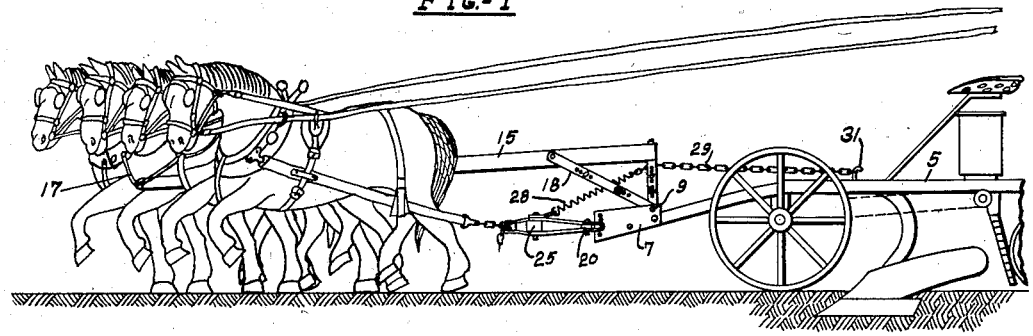
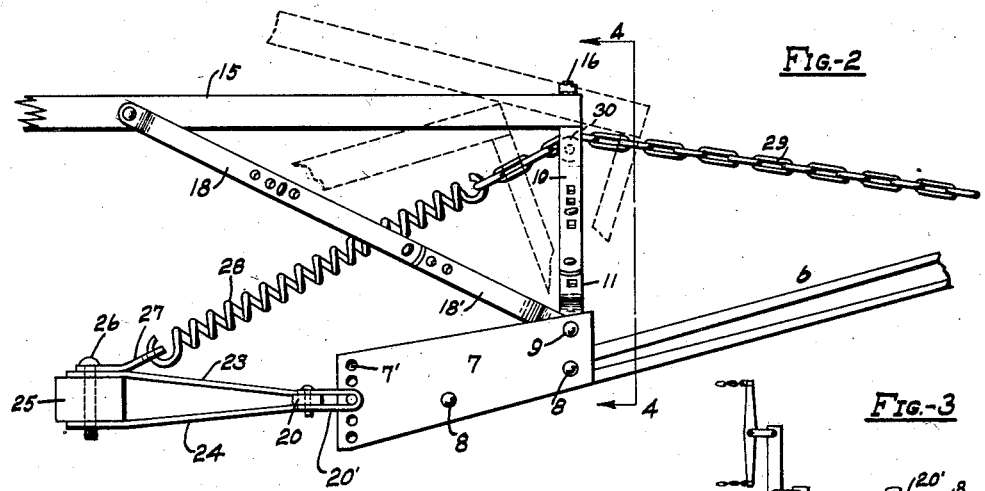
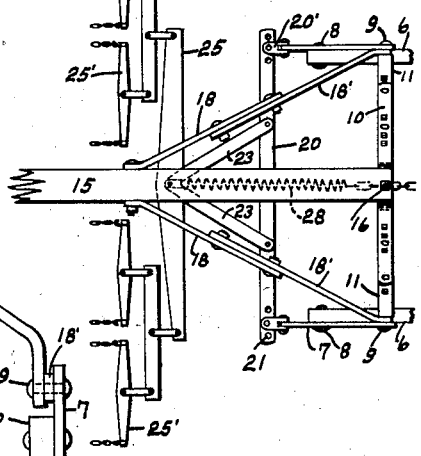
INVENTOR.
SIMEON B. HENDRICKS
BY *James A. Walsh*
ATTORNEY Patented Dec. 31, 1935

2,026,130

UNITED STATES PATENT OFFICE 2,026,130

DRAFT EQUALIZER

Simeon B. Hendricks, Rockford, Ill., assignor to J. I. Case Company, Racine, Wis., a corporation Application April 5, 1935, Serial No. 14,749

8 Claims. (Cl. 278—95)

My present invention relates to improvements especially adapted for use in connection with agricultural implements whereby the animals are relieved of the weight of a combined yoke pole and heavy evener as commonly used, the evener being supported independently from the pole, and the latter free to move as required, during field operations.

In the accompanying drawing, forming part hereof, Figure 1 illustrates in side elevation an implement equipped with my improvement; Fig. 2, an enlarged fragmentary elevation of the improvement; Fig. 3, a plan view; and Fig. 4 is an elevation of the pole support as seen when looking in the direction of the arrows 4—4 in Fig. 2.

In said drawing the numeral 5 indicates a wheeled implement embodying a frame 6 to which plates 7 are secured, at 8, and to which plates I pivotally connect, at 9, an adjustable pole support preferably comprising sectional members 10, 11, bolted together, Fig. 4, so that they may be detached and assembled to increase or reduce the width of the support. Upon the upper portion or apex 10' of the support the pole 15 is fixedly connected, at 16, and which extends forwardly, its outer end being attached to the usual neck-yoke 17 in a well known manner.

A sectional brace, 18, 18', is also pivoted at 9 to each plate 7, each brace extending diagonally in relation to and secured to pole 15. The plates 7 are connected by a clevis carrier 20, as also the frame members 6 to which the plates are secured, and which carrier embodies holes 21 at its ends so that the frame members may be brought closer together or farther apart according to land conditions on which the implement is used. When such adjustment has been made, for example, to narrow the implement frame, it becomes necessary to accordingly shorten the braces 18 and lower the pole support 10, which may be readily accomplished by adjusting the sectional elements composing said parts. The carrier 20 may also be vertically adjusted by means of clips 20' adapted to be secured in aligned holes 7' at the ends of the plates 7.

To the carrier 20 I secure a clevis, preferably comprising two members 23, 24, of substantially V-shaped formation in vertical alignment, and which converge forwardly of the carrier, the ends of the clevis overlapping and embracing an evener 25 having swingletrees 25' associated therewith, and which clevis members are secured to the evener by a bolt or pin 26. A keeper 27 is connected to said bolt, a spring 28 being anchored to the keeper, Fig. 2, and its opposite end having a chain 29 attached thereto which passes over and is guided by a sheave 30 suspended from the pole support 10 by the connection 16 or in other suitable manner and is then anchored to the vehicle, as at 31, Fig. 1, by which the chain links may be adjusted so that expansion of spring 28 will be at all times maintained sufficiently to sustain the evener 25 from the ground independently of any movement of the pole or its arched support 10 and diagonal braces 18 pivotally connected to said parts, which structure may assume varying positions according to ground inequalities, as indicated by the dotted lines in Fig. 2, independently of the evener. Therefore, the construction, arrangement and operation of the pole and its immediately associated parts are relieved from the weight of the evener, which is transferred through the flexible connection 28—29 directly to the vehicle frame, and the pulling strain which is imparted directly from the traces on the animals to the evener and carrier 20, so that there is no weight on the outer end of the pole and the only function required of it is to guide the implement and the animals pulling the latter. It will also be understood that by sustaining the evener from the ground the carrier 20, which may be adjusted to varying heights, is free to swing, and that the traces, Fig. 1, are held sufficiently high by the evener to prevent overstepping thereof by the animals.

I claim as my invention:

1. The combination, with a vehicle having frame members, of a carrier, a clevis connected to the carrier, an evener supported by the clevis, a pole support vertically and pivotally mounted on the frame members, and yielding means connecting the evener and vehicle and guided by the support for sustaining the evener from the ground.

2. The combination, with a vehicle having frame members, of a clevis, an evener supported by the clevis, a spring connected to the evener, a pole support vertically and pivotally mounted on the frame members, a pole thereon, and flexible means connecting the spring and vehicle and guided by the support for sustaining the evener from the ground.

3. The combination, with a vehicle having frame members, of an evener, means for supporting said evener, yielding means connected to the evener, a pole support vertically, pivotally and adjustably mounted on the frame members, and flexible means connecting the yielding means and vehicle and guided by the support for sustaining the evener from the ground.

4. The combination, with a vehicle having frame members, of a pole support vertically and pivotally mounted on the frame members and adapted to be increased and decreased in width, a pole connected thereto, braces connecting the support and pole, a clevis supported by the vehicle, an evener mounted on the clevis, and means connected to the evener and vehicle and guided by the pole support for sustaining the evener from the ground.

5. In a device of the character described, a vertically and pivotally mounted pole support, a pole connected to the support, a brace pivotally connecting the support and pole, a clevis associated with the support, an evener on the clevis, and yielding means connected to the clevis and guided by the support for sustaining the evener from the ground.

6. The combination, with a vehicle, of a frame, a pole support vertically and pivotally mounted on the frame, an evener supported on the frame, and means connecting the evener and frame and guided by the pole support for sustaining said evener from the ground.

7. The combination, with a vehicle having oppositely disposed frame members, a plate on each of the members, a vertical pole support comprising sectional members pivotally connected to the plates, a pole connected to the support, diagonally arranged braces pivotally connected to the plates and secured to the pole, a clevis carrier connecting said plates, a clevis on the carrier, an evener mounted on the clevis, and flexible means connecting the vehicle and evener and guided by the pole support to sustain the evener from the ground.

8. The combination, with an evener having oppositely disposed frame members, a pole support pivotally connected to the frame members, a pole secured to the support, a brace pivotally connecting the support and pole, said support, pole and brace being adjustable as a unit in vertical directions, a clevis supported by the frame, an evener connected to the clevis, and flexible means connecting the evener to the vehicle and guided by the pole support to sustain the evener from the ground.

SIMEON B. HENDRICKS.